United States Patent
Doron et al.

(10) Patent No.: US 8,961,097 B2
(45) Date of Patent: Feb. 24, 2015

(54) DUAL CONTAINER TRAILER SYSTEM

(76) Inventors: Daniel A. Doron, Houston, TX (US);
Leo S. Doron, Houston, TX (US)

( * ) Notice: Subject to any disclaimer, the term of this patent is extended or adjusted under 35 U.S.C. 154(b) by 78 days.

(21) Appl. No.: 13/127,022

(22) PCT Filed: Oct. 30, 2009

(86) PCT No.: PCT/US2009/062766
§ 371 (c)(1),
(2), (4) Date: Apr. 29, 2011

(87) PCT Pub. No.: WO2010/062685
PCT Pub. Date: Jun. 3, 2010

(65) Prior Publication Data
US 2011/0200416 A1    Aug. 18, 2011

Related U.S. Application Data

(60) Provisional application No. 61/109,831, filed on Oct. 30, 2008.

(51) Int. Cl.
*B60P 1/16* (2006.01)
*B60P 1/64* (2006.01)

(52) U.S. Cl.
CPC .................................. *B60P 1/6454* (2013.01)
USPC ........................... 414/482; 414/494; 414/538

(58) Field of Classification Search
USPC .......... 414/482–485, 491–494, 538, 812, 813
See application file for complete search history.

(56) References Cited

U.S. PATENT DOCUMENTS

| | | | | |
|---|---|---|---|---|
| 2,963,185 A | * | 12/1960 | Jones et al. | 414/494 |
| 3,130,847 A | * | 4/1964 | Dempster et al. | 414/491 |
| 4,130,211 A | * | 12/1978 | Abascal | 414/475 |
| 5,203,668 A | | 4/1993 | Marmur | |
| 5,354,165 A | | 10/1994 | Booher | |
| 5,460,473 A | | 10/1995 | LaMora et al. | |
| 5,803,699 A | * | 9/1998 | Pinkston | 414/498 |
| 6,354,787 B1 | | 3/2002 | O'Daniel | |
| 6,655,904 B2 | | 12/2003 | Landoll et al. | |
| 7,108,315 B1 | | 9/2006 | McCloud | |
| 2007/0003398 A1 | | 1/2007 | Hernandez | |

OTHER PUBLICATIONS

International Application No. PCT/US2009/062766 Search Report and Written Opinion dated May 19, 2010.
Canadian Patent Application No. 2,742,118 Office Action dated Oct. 9, 2012.
Dragon Products, Ltd. Specification Sheet for Two Container Trailer (TCT), 1994.

* cited by examiner

*Primary Examiner* — Jonathan Snelting
(74) *Attorney, Agent, or Firm* — Conley Rose, P.C.

(57) ABSTRACT

A system for transporting containers includes a trailer frame with independent hoist systems for loading and unloading multiple containers. The trailer frame supports the containers during transport, inclines to load/unload the containers, and supports a tilting sub-frame that loads/unloads a container. Thus, the system is chassis-less.

35 Claims, 19 Drawing Sheets

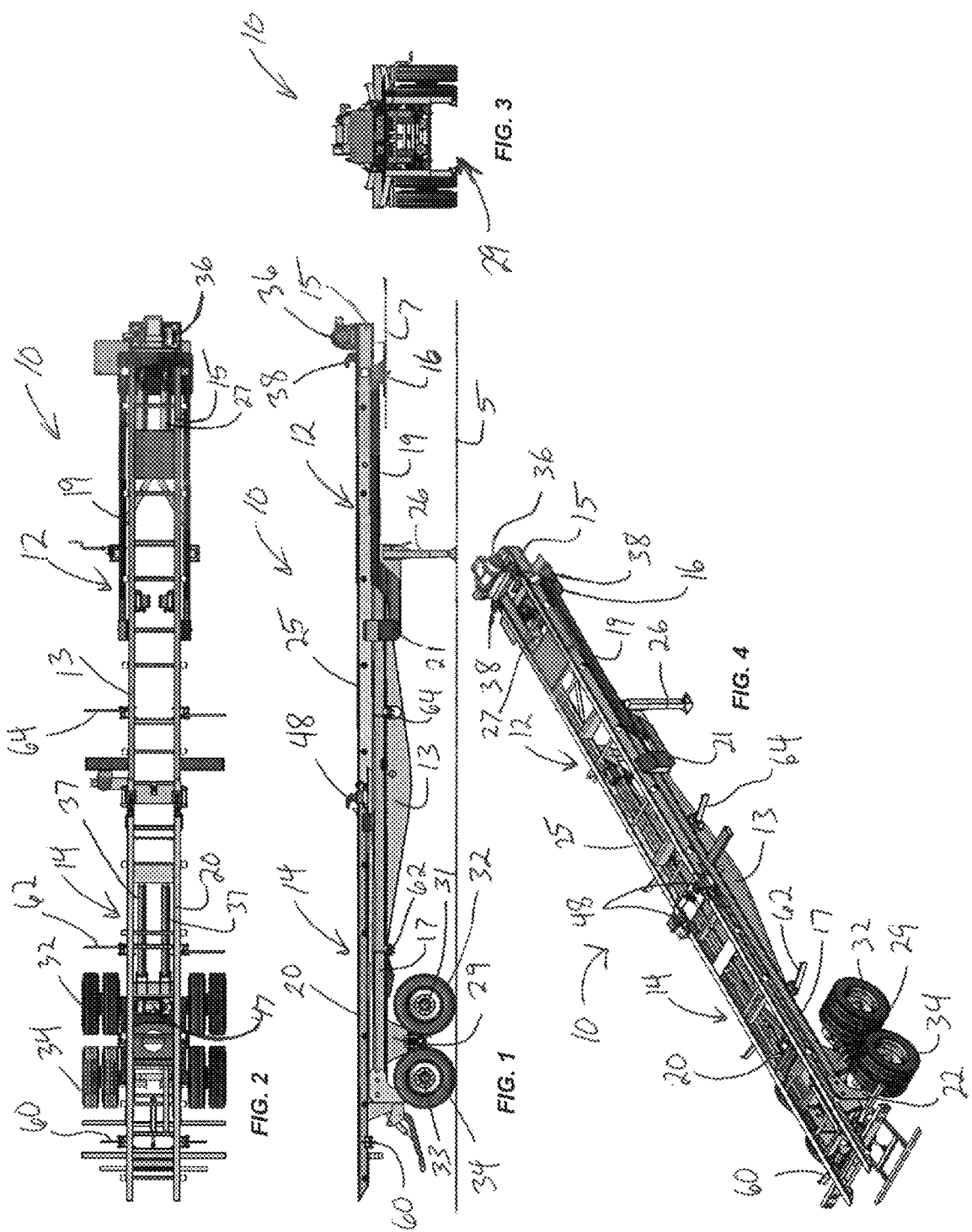

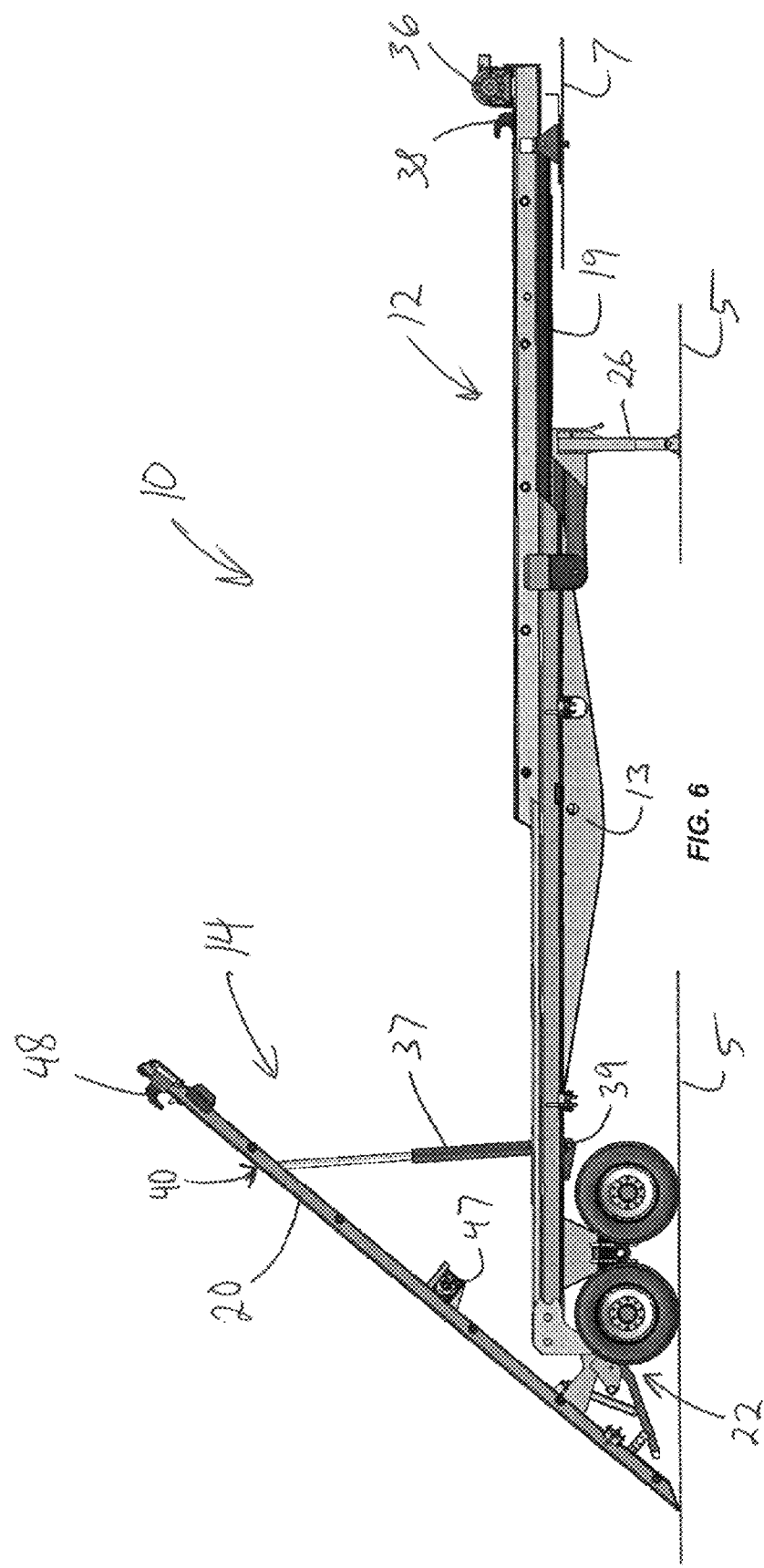

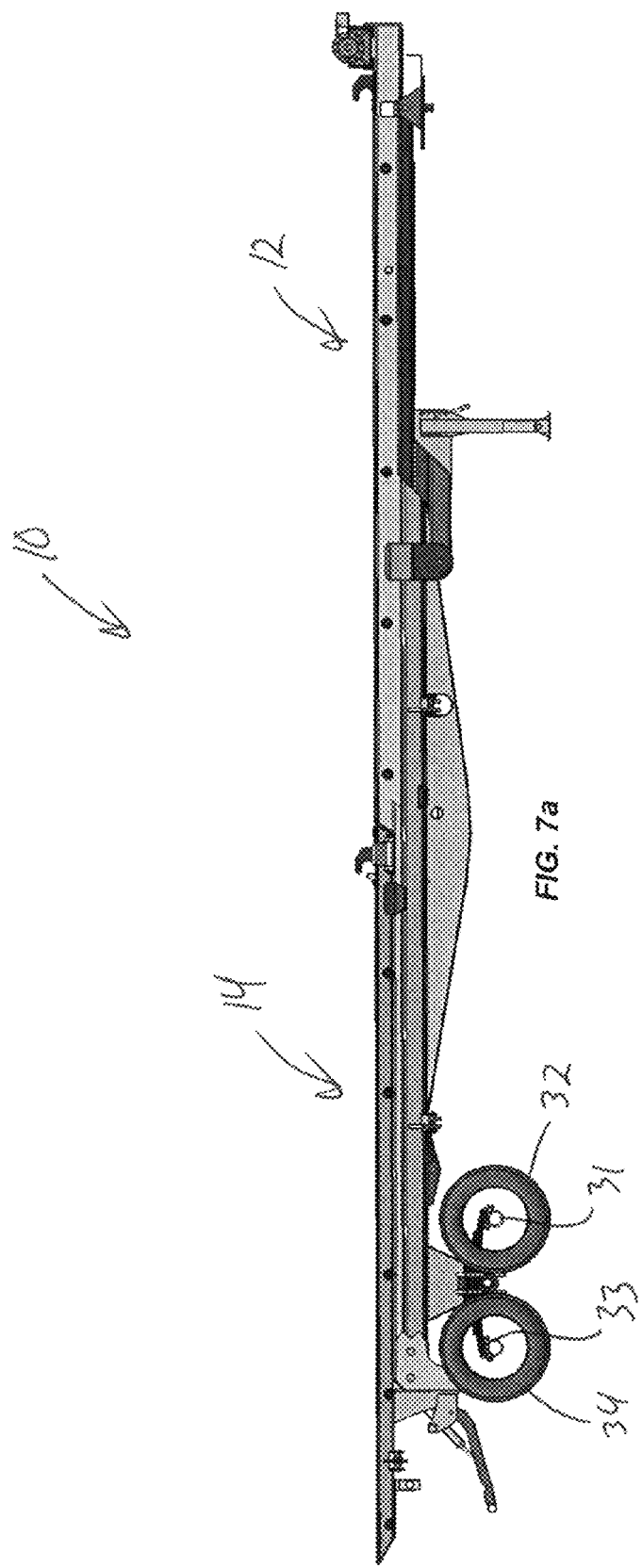

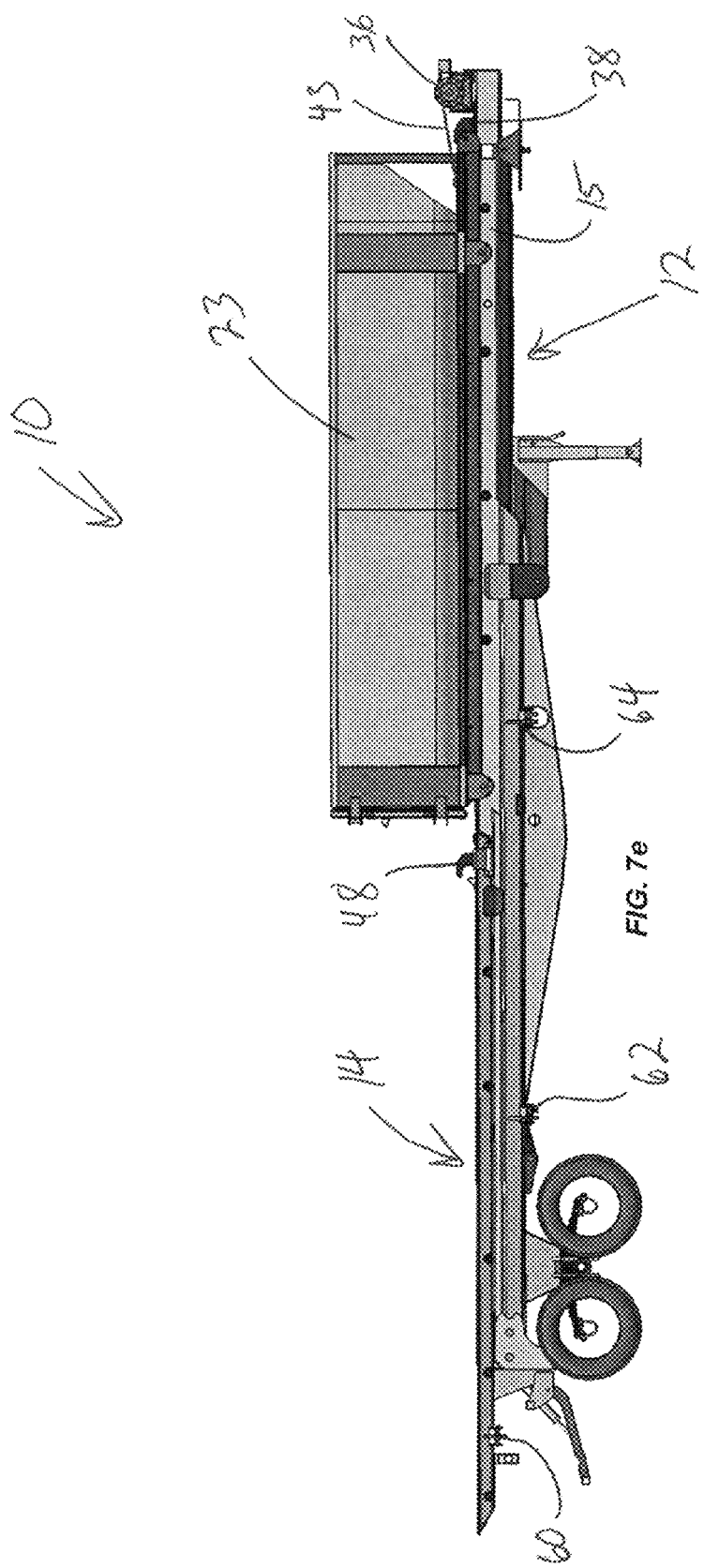

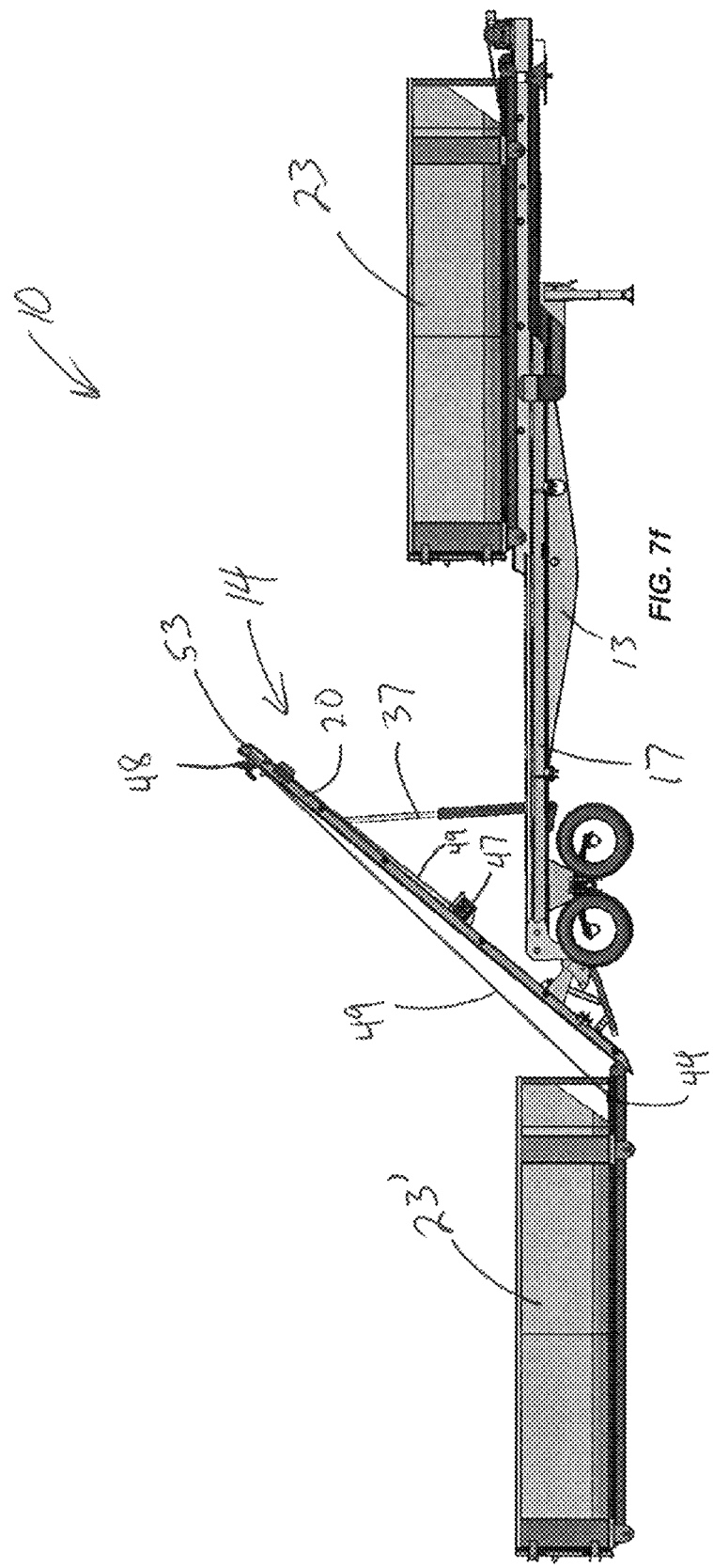

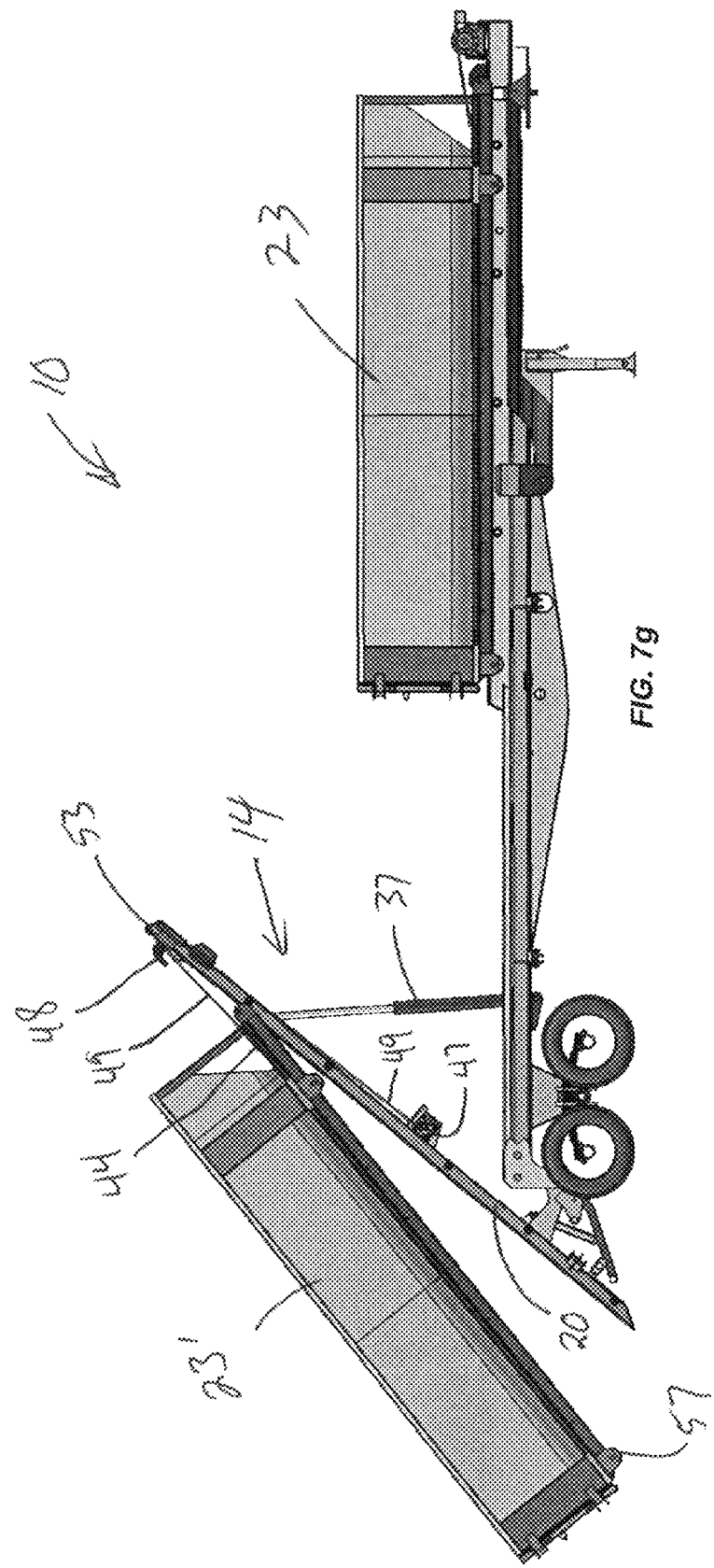

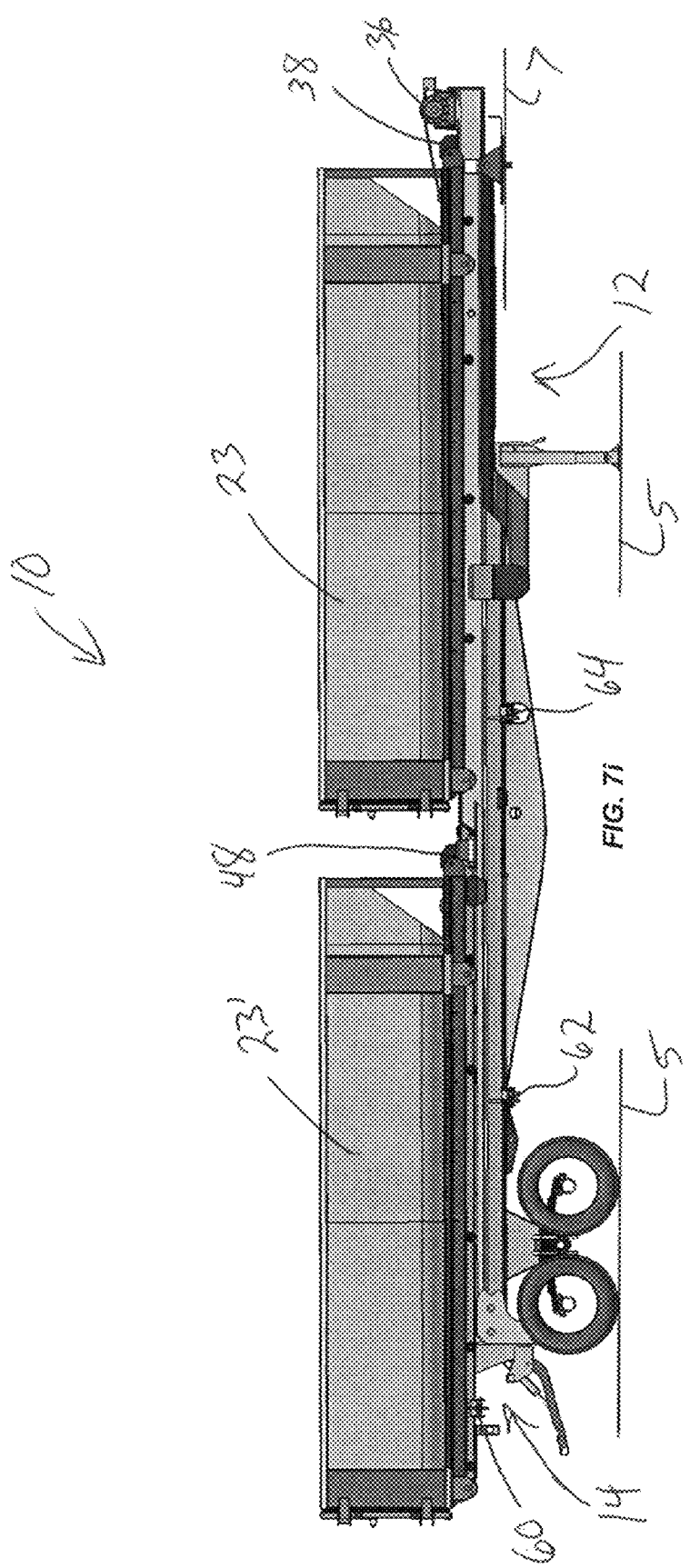

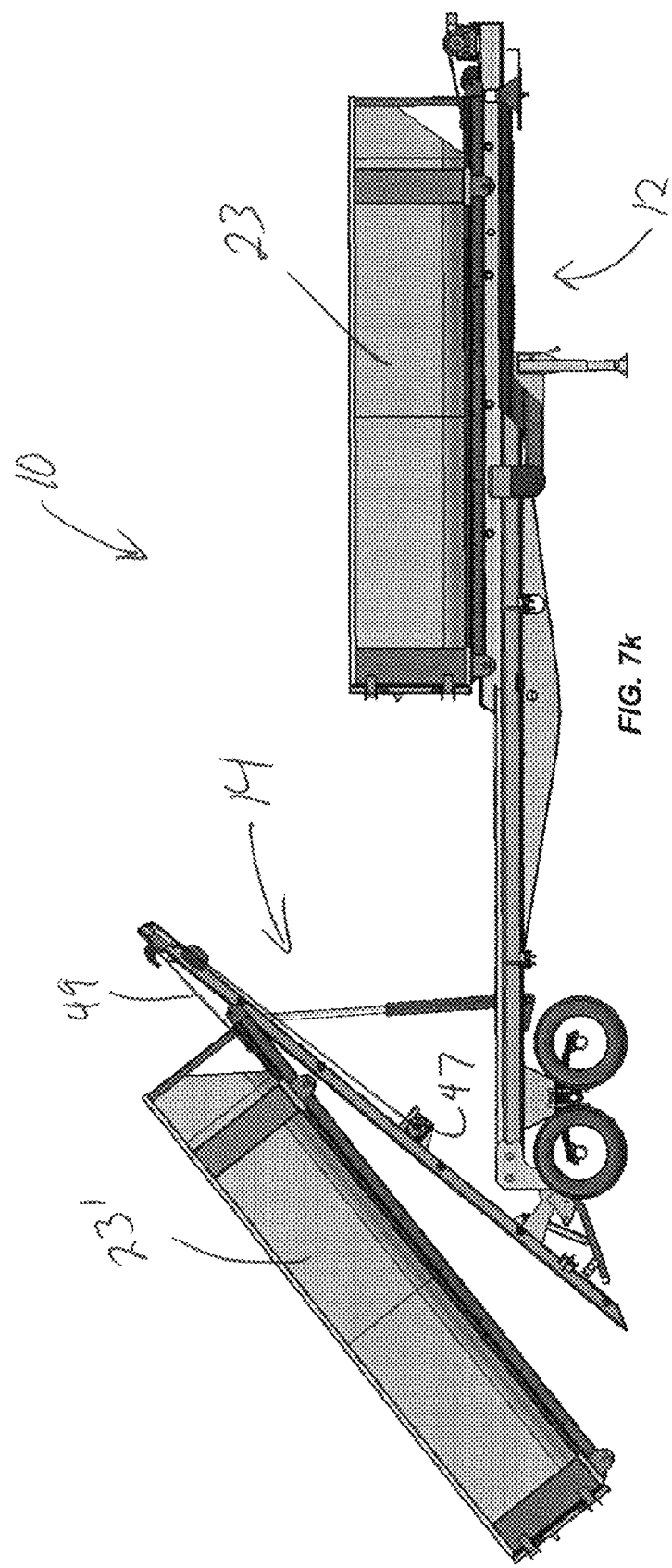

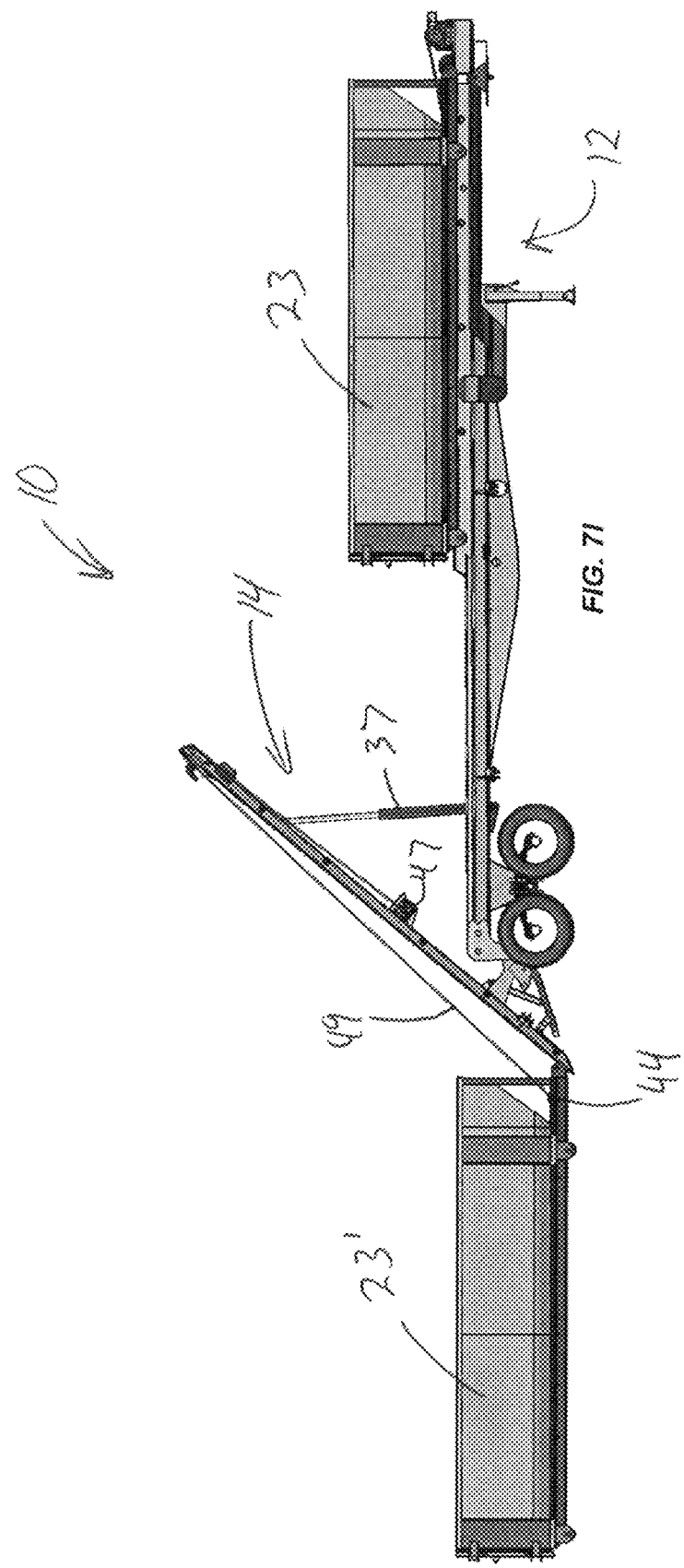

US 8,961,097 B2

DUAL CONTAINER TRAILER SYSTEM

This is the U.S. National Stage Under 35 U.S.C. §371 of International Patent Application No. PCT/US2009/062766 filed Oct. 30, 2009, which claims the benefit of U.S. Provisional Application Ser. No. 61/109,831, filed Oct. 30, 2008 and entitled "Dual Container Trailer System."

STATEMENT REGARDING FEDERALLY SPONSORED RESEARCH OR DEVELOPMENT

Not applicable.

BACKGROUND

In the material transport, loading and unloading industry, trailers are used to move containers from place to place. Sometimes multiple types of materials require transport in separate containers, or the load capacity of the trailer must be maximized. A trailer may be outfitted to support two containers. Existing dual container trailers are not always reliable or produce satisfactory results. In particular, the inline positioning of the containers creates logistical problems and speedy loading and unloading is sacrificed. Further, the means for loading and unloading add to the complexity and manufacturing costs of the trailer.

The principles of the present disclosure are directed to overcoming one or more of the limitations of existing trailers for loading, unloading and transporting multiple roll-off containers.

SUMMARY

In an embodiment, a system for transporting containers includes a main trailer frame, a sub-frame coupled to the main frame, a first hoist system to pivot the main frame, and a second hoist system coupled between the main frame and the sub-frame to pivot the sub-frame. The first hoist system may be configured to incline the main frame to load or unload a first container. The second hoist system may be independently operable of the first hoist system to incline the sub-frame to load or unload a second container. A first winch may be coupled to the main frame. A second winch may be coupled to the sub-frame. The main frame may be pivotally coupled to a wheel support assembly, and the sub-frame may be pivotally coupled to the main frame. In some embodiments, the system is chassis-less.

In an embodiment, a system for transporting containers includes a first frame defining a top support surface configured to support at least a first container and a second container, a wheel support assembly pivotally coupled to the first frame, and a second frame pivotally coupled to the first frame. The system may further include a first hoist system to pivot the first frame about the wheel support assembly. The system may further include a second hoist system to pivot the second frame relative to the first frame. The first and second hoist systems may operate independently of each other to separately pivot the first and second frames.

In an embodiment, a method of transporting containers includes actuating a first hoist system to incline a main frame, providing a sub-frame and a second hoist system coupled to and inclined with the main frame, pulling a first container into a stored position on the main frame, and reclining the main frame using the first hoist system. Actuating the first hoist system to incline the main frame may further comprise pivoting the main frame about a wheel support assembly engaged with the ground. The method may further include actuating the second hoist system, while the main frame is reclined, to pivot the sub-frame relative to the main frame and incline the sub-frame, pulling a second container into a stored position on the sub-frame and the main frame, and reclining the sub-frame using the second hoist system. The method may further include coupling the system to a truck for transport. The method may further include re-inclining the sub-frame to unload the second container with the second hoist system, and separately re-inclining the main frame to unload the first container with the first hoist system.

In an embodiment, an apparatus for loading, transporting, and unloading containers including a trailer frame having a front portion and a rear portion, both of which define a top support surface for both transporting the containers and inclining them for loading/unloading. Consequently, in some embodiments, the apparatus is chassis-less. The trailer frame also includes a wheel frame upon which the frame is pivotally mounted. The rear frame portion also includes a sub-frame or tilt frame pivotally mounted thereon for supporting a container. A first pivot operatively connects the rear of the trailer frame and the wheel frame for pivoting the trailer frame and any associated container about a pivot point at the wheel frame. A second pivot operatively connects the rear portion of the trailer frame and the tilt frame for pivoting the tilt frame and a second container about a pivot point located at the rear portion. A first cable drive is located on the front portion of the trailer frame and has an engagement member for engaging a first container and transporting it onto the top support surface of the trailer frame to a transport position. A second cable drive is located on the tilt frame and has an engagement member for engaging the second container and transporting the second container onto the top support surface of the frame to a transport position. A first stop is connected to the trailer frame and a second stop is moveably coupled to the tilt frame such that it can be locked into position above or below the top surface of the tilt frame.

In an embodiment of the method of loading a dual container transport trailer with a pair of containers, a first container is moved onto the inclined trailer frame and into the transport position by engaging the container with the engagement member of the first cable drive and actuating the first cable drive until the first container engages a first stop. A second container is moved onto the inclined sub-frame or tilt frame and into the transport position by engaging the container with the engagement member of the second cable drive and actuating the second cable drive until the second container engages a moveable second stop.

BRIEF DESCRIPTION OF THE DRAWINGS

For a more detailed description of preferred embodiments of the present invention, reference will now be made to the accompanying drawings, wherein:

FIGS. 1-4 are schematic illustrations of a dual roll-off container trailer in accordance with an embodiment of the invention, with FIG. 1 depicting a side view of the trailer, FIG. 2 depicting a top view of the trailer, FIG. 3 depicting an end view of the trailer, and FIG. 4 depicting an isometric view of the trailer;

FIG. 6 depicts the dual roll-off container trailer with the rear tilt frame in the raised position;

FIGS. 7a-7i depict the steps for loading containers using a dual roll-off container trailer, with FIG. 7a depicting a first step with the main trailer frame in the lowered position prior to loading the forward container, FIG. 7b depicting a second step with the main trailer frame in the raised position prior to loading the forward container, FIG. 7c depicting a third step with the main trailer frame in the raised position while the forward container is being retracted and still contacting the ground, FIG. 7d depicting a forth step with the main trailer frame in the raised position while the forward container is being retracted to the upper position and fully supported by the trailer, FIG. 7e depicting a fifth step with the main trailer frame in the lowered position and the forward container retracted into the transport position, FIG. 7f depicting a sixth step with the main trailer frame in the lowered position and the rear tilt frame in the raised position prior to loading the rear container, FIG. 7g depicting a seventh step with the main trailer frame in the lowered position and the rear tilt frame in the raised position while the rear container is being retracted and still contacting the ground, FIG. 7h depicting an eighth step with the main trailer frame in the lowered position and the rear tilt frame in the raised position while the rear container is being retracted to the rear position and fully supported by the trailer, FIG. 7i depicting a ninth step with the main trailer frame in the lowered position and the rear tilt frame in the lowered position and the rear container retracted into the transport position; and FIGS. 7j-7p depict the steps for unloading containers using a dual roll-off container trailer and are the loading steps 7a-7i in reverse order.

DETAILED DESCRIPTION

Figure 5:
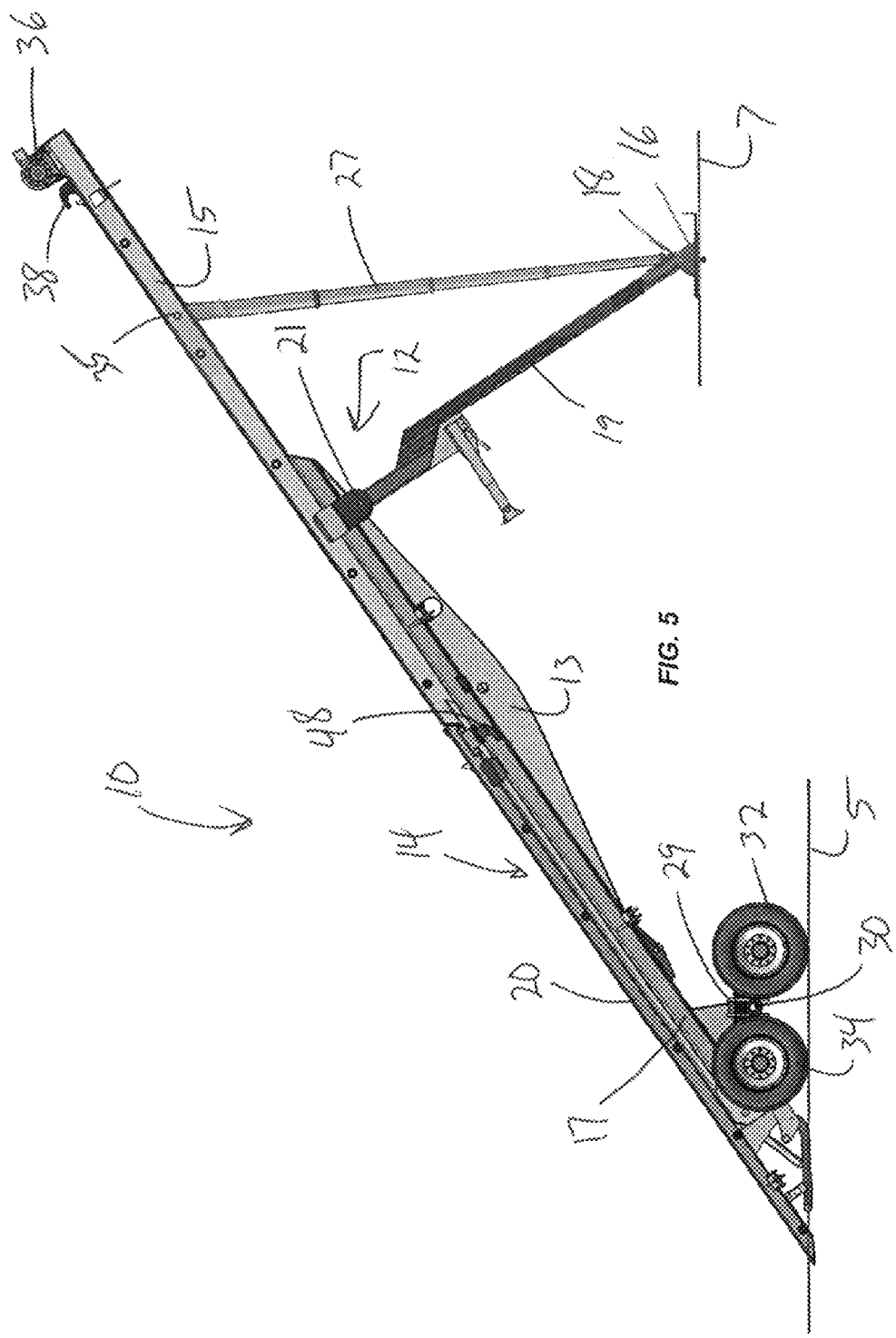
FIG. 5 depicts the dual roll-off container trailer with the main trailer frame in the raised position.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

In the following discussion and in the claims, the terms "including" and "comprising" are used in an open-ended fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

With reference to FIGS. 1-4, a moveable container support system designated generally as 10 is shown. The system 10 may also be referred to as a container trailer or a dual roll-off container trailer. The trailer 10 includes a first hoist system 12 and a second hoist system 14. The first hoist system 12 includes a main trailer frame 13 comprising a forward frame portion 15 and a rear frame portion 17. A moveable support arm 19 is pivotally mounted to the forward frame portion 15 at a pivot 21. The moveable support arm 19 includes a support leg 26 resting on ground 5. A pair of hydraulic cylinders 27 is operably coupled between the forward frame portion 15 and the support arm 19. In some embodiments, other known extension or actuation means are operably coupled between the forward frame portion 15 and the support arm 19. A first cable drive mechanism 36 and a first locking member 38 are mounted to the forward frame portion 15. In some embodiments, the first cable drive mechanism is a winch. In some embodiments, other known drive mechanisms are operably coupled to the forward frame portion 15.

The second hoist system 14 includes a sub-frame or tilt frame 20 pivotally mounted to the rear portion 17 of the main trailer frame 13 at a pivot 22 (FIG. 4). A pair of hydraulic cylinders 37 (FIG. 2) is operably coupled between the tilt frame 20 and the rear frame portion 17. A second cable drive mechanism 47 is operably coupled to the tilt frame 20 (see FIG. 6). In some embodiments, the second cable drive mechanism is a winch. In some embodiments, other known actuation or drive means are operably coupled to the tilt frame 20. Supporting the rear frame portion 17 is a wheel support assembly 29 including tandem wheel supporting axles 31, 33 and wheels 32, 34. The forward frame portion 15 and the tilt frame 20 generally define a top support surface 25 for supporting roll-off containers as will be further described herein.

Referring to FIG. 1, the moveable support arm 19 includes a hitch 16 that may be coupled to a truck 7. The hitch 16 includes a pivot point 18 (shown in FIG. 5). The truck 7 connects to and supports trailer at hitch 16 for moving the trailer 10 between job sites, storage terminals, dumping depots, and the like.

Referring now to FIG. 5, the trailer 10 is shown in a loading or unloading position using a first hoist system 12. The frame 13 is rotated about a pivot 30 that couples the rear frame portion 17 and the wheel support assembly 29. The trailer frame 13 and any container supported thereon may be moved through a range of positions including a horizontal position shown in FIGS. 1-4 and various degrees of inclination as shown in FIG. 5 and elsewhere herein. FIG. 5 also illustrates that the means for rotating the frame 13 about the pivot 30 includes the support arm 19, the hydraulic cylinders 27 (or, a hydraulic piston/cylinder arrangement) and the hitch 16. To pivot the frame 13 about the pivot 30, the movement of both the truck 7 and the axles 31, 33 and wheels 32, 34 are restricted, either through application of trailer brakes or wheel chalks, or any other means that sufficiently restricts such movement. Alternatively, the truck and axles are left free to move. Then, the hydraulic cylinders 27 are actuated to push the forward frame portion 15 upward at a pivot 35. As the hydraulic cylinders 27 push up on the forward frame portion 15, the support arm 19 rotates about the pivots 18, 21 and the frame 13 rotates about the pivot 30.

Referring next to FIG. 6, the trailer is shown in another loading or unloading position using a second hoist system 14. The pivot 22 (concealed by structure) connects the tilt frame 21 and the rear frame portion 17 for pivoting the tilt frame 21 and any supported container through a range of positions including a horizontal position show in FIGS. 1-4 and various degrees of inclination as shown in FIG. 6 and elsewhere herein. FIGS. 2 and 6 also illustrate that the means for rotating the tilt frame 21 about the pivot 22 includes two hydraulic cylinders 37 (or, a hydraulic piston/cylinder arrangement) connected to the rear frame portion 17 at pivots 39. As the cylinders 37 extend, they push on the tilt frame 21 at pivots 40 which causes pivoting of the tilt frame 21 about the pivot 22.

Figure 7B:
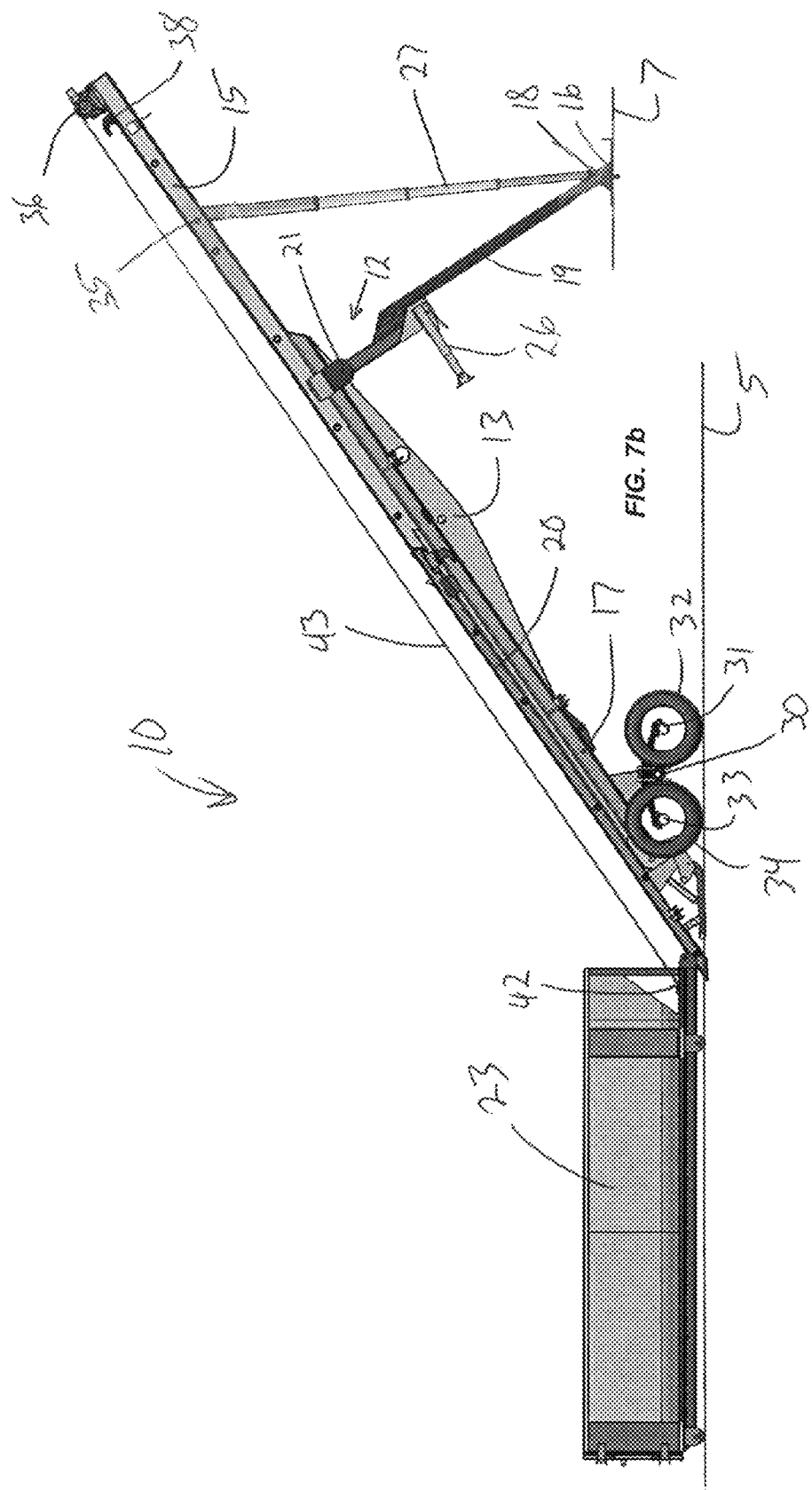

The first hoist system 12 includes the first winch 36 with a first cable or wire 43 coupled to a connector 42 on a first container 23 (shown in FIG. 7b). The winch 36 extends and retracts the cable 43 providing the motive force to the container 23 to travel along the top support surface 25 of the trailer 10. A first stop member 38 engages the container 23 and locks it in place.

The second hoist system 14 includes the second winch 47 with a second cable or wire 49 coupled to a connector 44 on a second container 23' (shown in FIG. 7f). The cable 49 extends from the winch 47, passes over a roller 53 located at the end of the tilt frame 20, and extends to the connector 44 on the second container 23'. The winch 47 extends and retracts the cable 49 providing the motive force to the container 23' to travel along the top support surface of the tilt frame 20. A second stop member 48 engages the container 23' and locks it in place. The second stop 48 is moveably coupled (such as hydraulically) to the tilt frame 20 such that it can be positioned for use, projecting above the top surface 25 as shown in FIGS. 1 and 7f, or to not interfere with movement of the container 23, retracted below the surface 25 as shown in FIG. 7b. For example, the stop 48 can be rotated about an axis to change its positions.

Figure 7C:
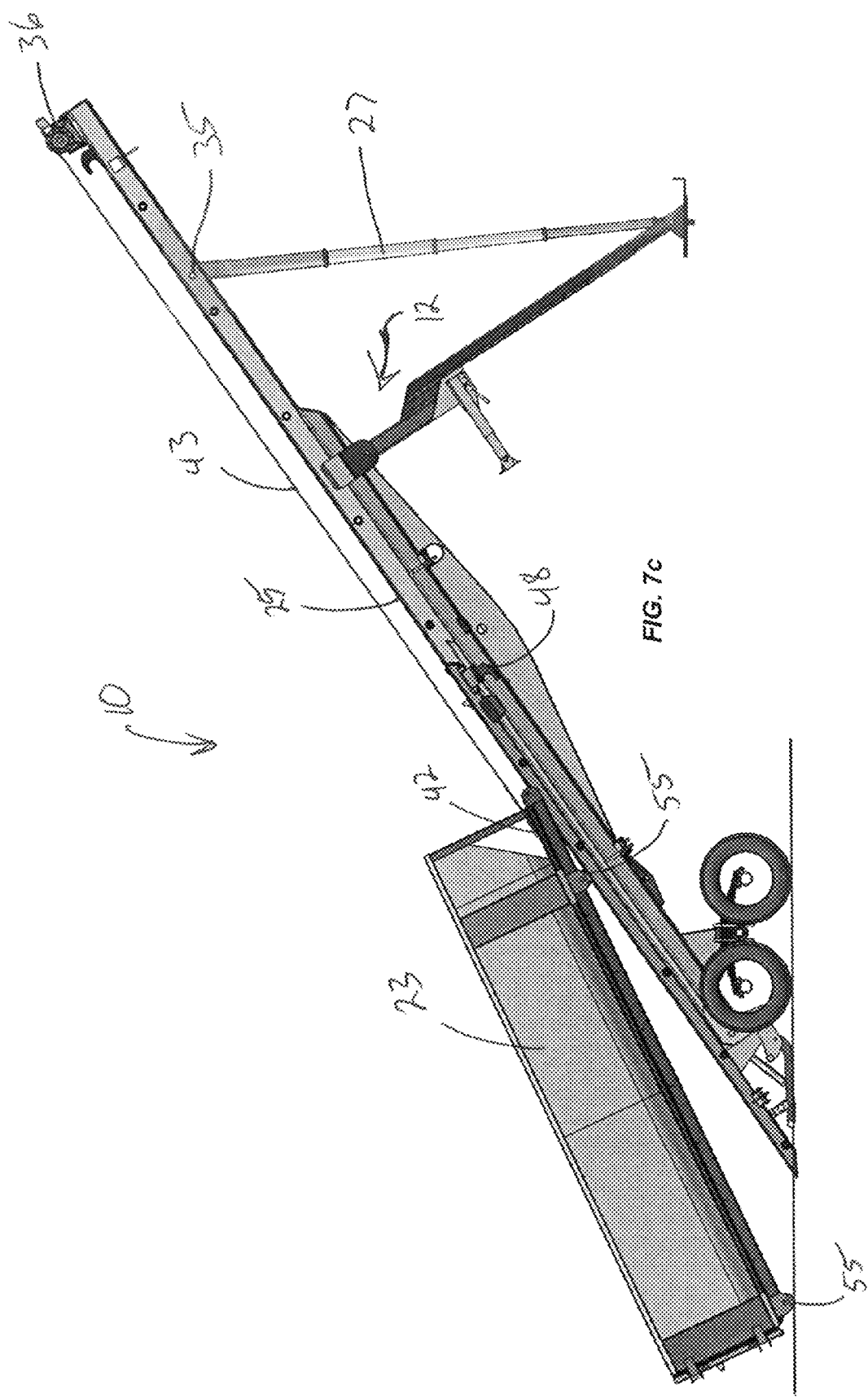
Figure 7D:
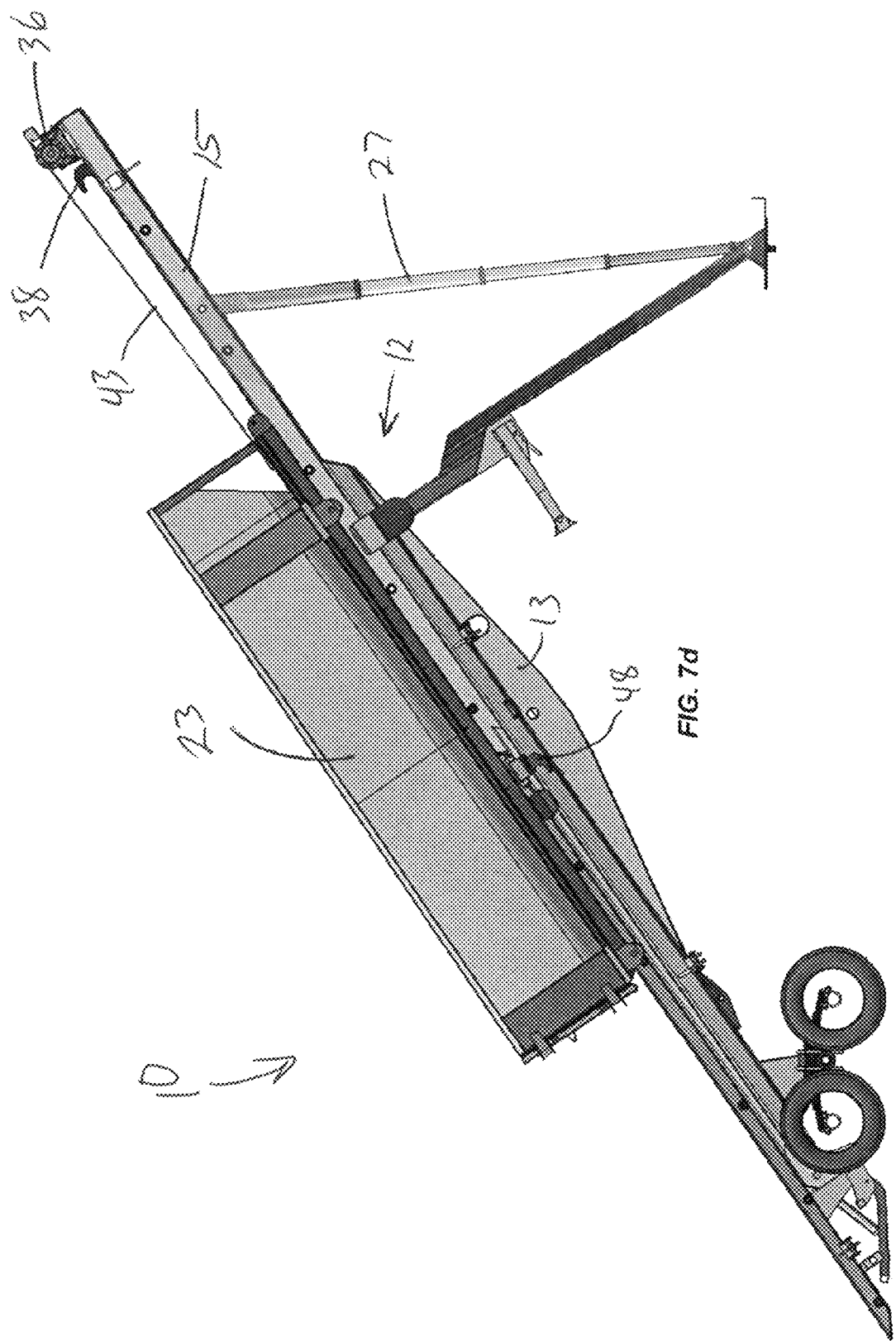
Figure 7H:
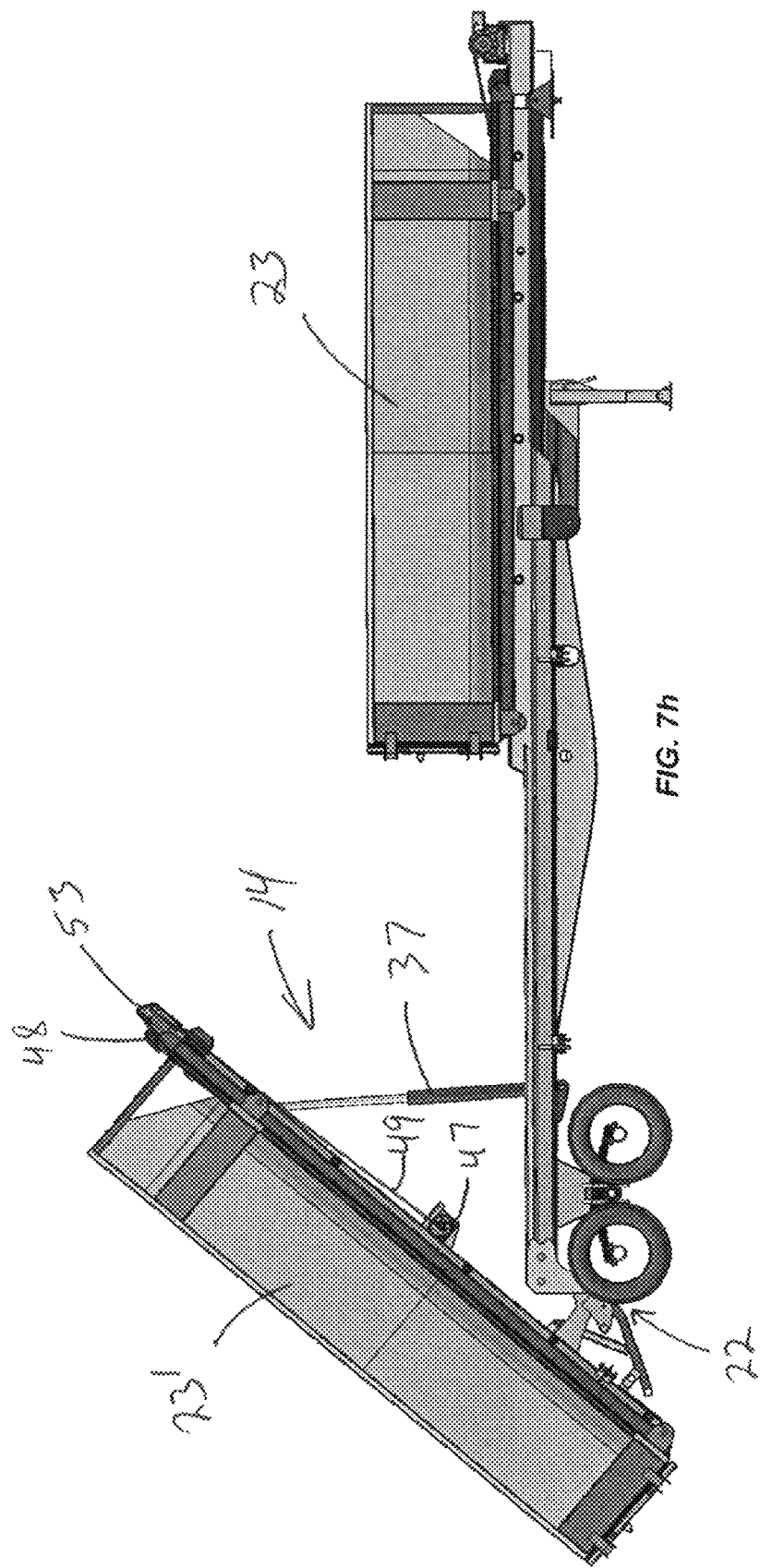
Figure 7J:
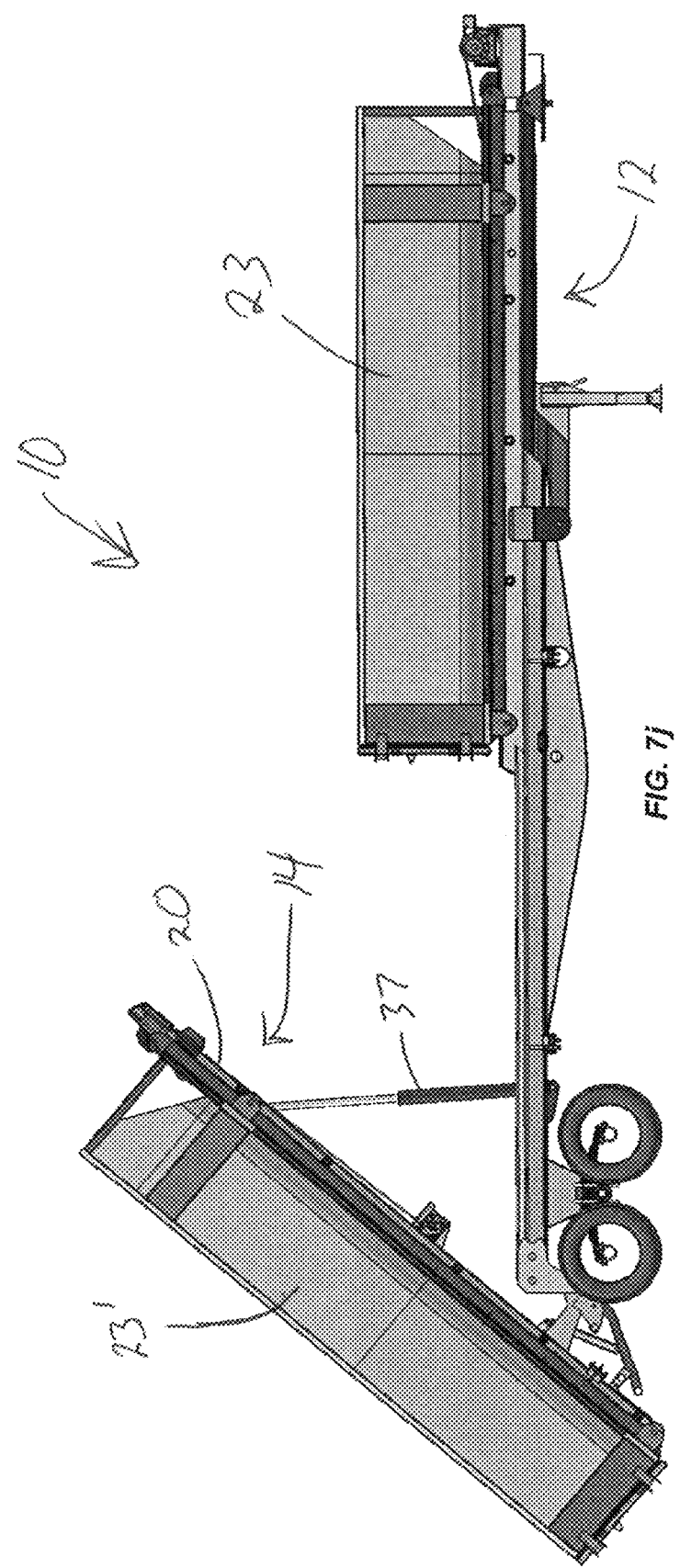
Figure 7M:
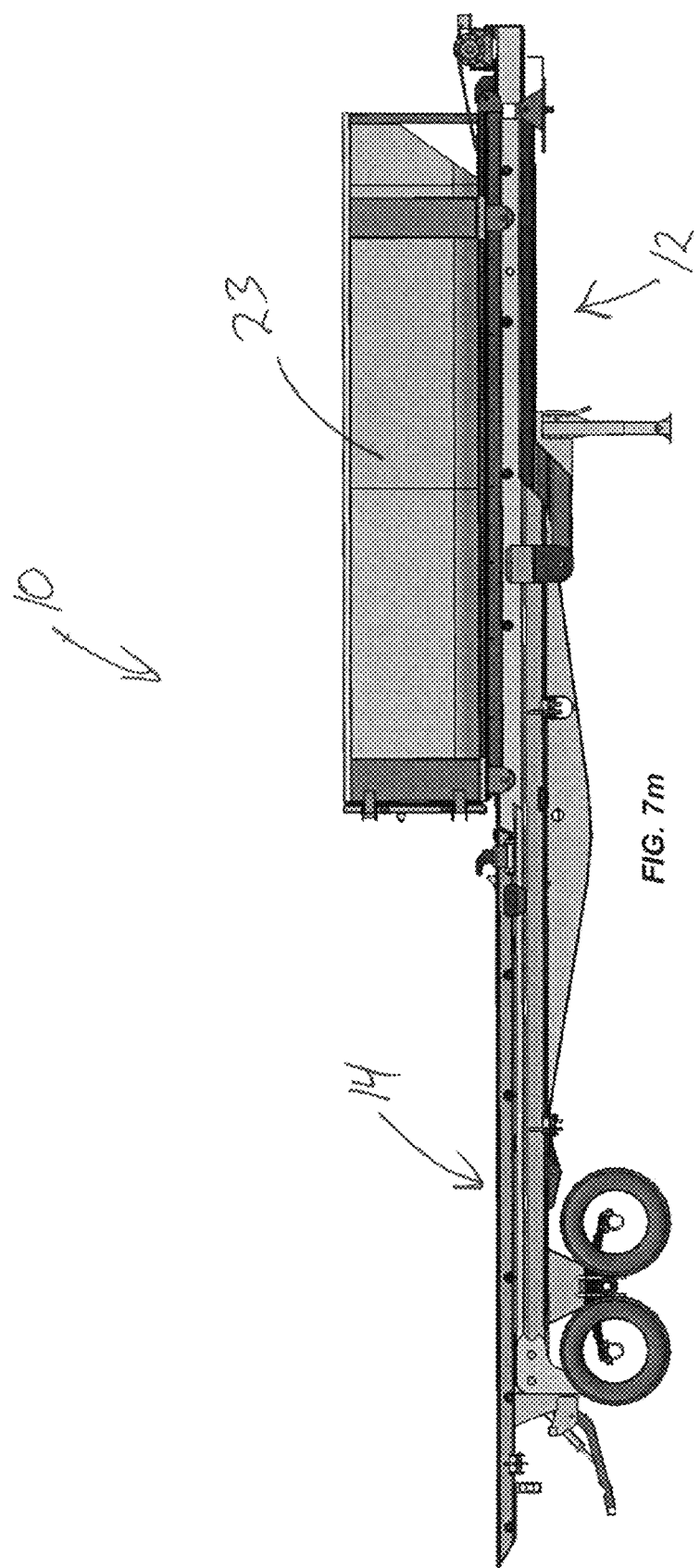
Figure 7N:
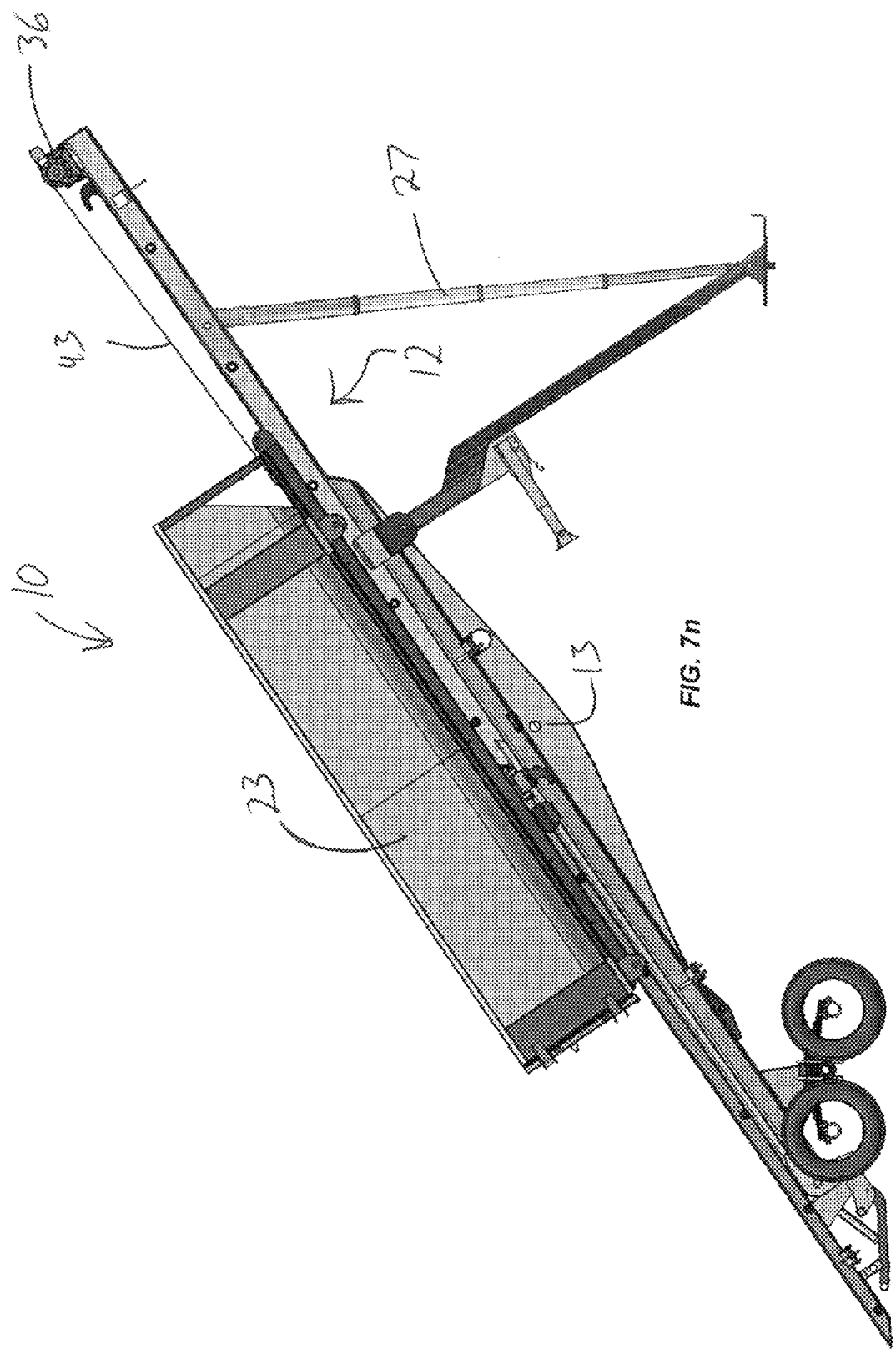
Figure 7A:
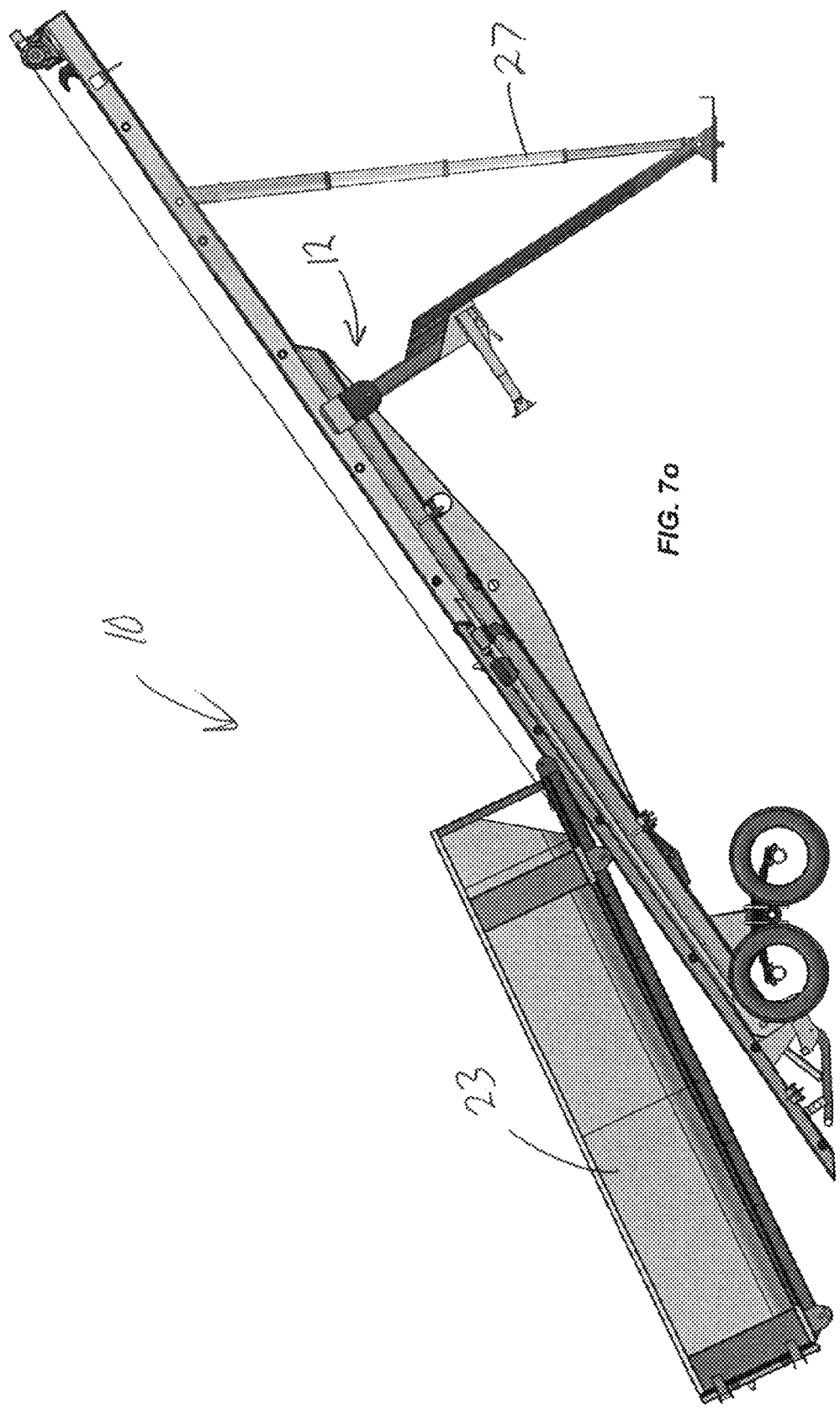

FIGS. 7a-7i depict the steps in a method for loading containers using a dual roll-off container trailer in accordance with an embodiment of the disclosure. As shown in FIG. 7a, the trailer has an initial configuration and is preferably located in proximity with containers that are initially resting at ground level.

The containers discussed herein are commercially available from a variety of sources and are used in the refuse and solid waste/sludge handling industries, as well as other industries. The containers can be open topped or closed. For example, the containers could be used as a part of a stationary refuse compaction system. However, the apparatus and method of the present disclosure have application to containers associated with both these and other industries, or to open containers in general which are transported on truck-driven trailers for delivery and drop-off between various locations.

Referring now to FIG. 7b, the first hoist system 12 is actuated and the main trailer frame 13 is pivoted to the inclined position by the action of the hydraulic cylinders 27 extending between the hitch 16 and the forward frame portion 15, as previously described. The support arm 19 rotates about the pivots 18, 21 and the support leg is lifted off the ground 5. The frame 13 rotates about the pivot 30 to its inclined and loading position. A first container 23, positioned on the ground 5, is coupled to the cable 43 at the connector 42.

Referring now to FIG. 7c, the winch 36 retracts the cable 43 and pulls the first container 23 onto the top support surface 25. Movement of the container 23 is aided by rollers 55. The stop member 48 is rotated downward so as not to interfere with the container 23. FIG. 7d shows the container 23 as it is pulled past the stop member 48. The winch 36 pulls the container 23 until the front frame portion 15 fully supports it and the first stop 38 engages the container, holding it in place. With the first container 23 loaded onto the front frame portion 15, the hoist system 12 is again actuated and the main trailer frame 13 is rotated about the pivot 30 to bring it to the horizontal or reclined position, as shown in FIG. 7e. The container 23 is now in the transport position. To help secure the container 23 to the frame 13, a first set of locks 64 are actuated to engage the container 23. Referring to FIGS. 1, 2 and 4, the locks 64 include an open position, as seen in FIG. 4, and rotate upward to secure the container by extending a hydraulic cylinder coupled thereto. The second stop member 48 may now be actuated to its locking position.

Referring now to FIG. 7f, the second hoist system 14 may now be actuated. The tilt frame 20 is pivoted to the inclined position by extending the hydraulic cylinders 37. Further, a second container 23' is coupled to the second cable 49 at the connector 44.

Referring next to FIG. 7g, the second winch 47 retracts the second cable 49 over the roller 53 and pulls the second container 23' onto the tilt frame 20. Movement of the container 23' is aided by rollers 57. FIG. 7g also shows that second stop 48 is rotated and locked into a position above the top of the tilt frame 20.

Referring to FIG. 7h, the winch 47 pulls the container 23' until the tilt frame 20 fully supports it and the second stop 51 engages the container, holding it in place. With the second container 23' located on the tilt frame 20, the second hoist system 14 is again actuated and the tilt frame 20 is rotated about the pivot 22 by the cylinders 37 to bring it to the horizontal position as shown in FIG. 7i by reversing the steps to incline the tilt frame 20 as previously described. This leaves the container 23' in the transport position with both the containers 23, 23' resting in a horizontal position upon the support surface of the main trailer frame. As with the container 23, the container 23' is secured to the frame 13 by actuating a second set of locks 60. The locks 60 start in an open position, as shown in FIG. 4, and a hydraulic cylinder disposed between the non-locking ends of the locking arms is extended to rotate the arms upward and into engagement with the container 23'.

Figure 7P:
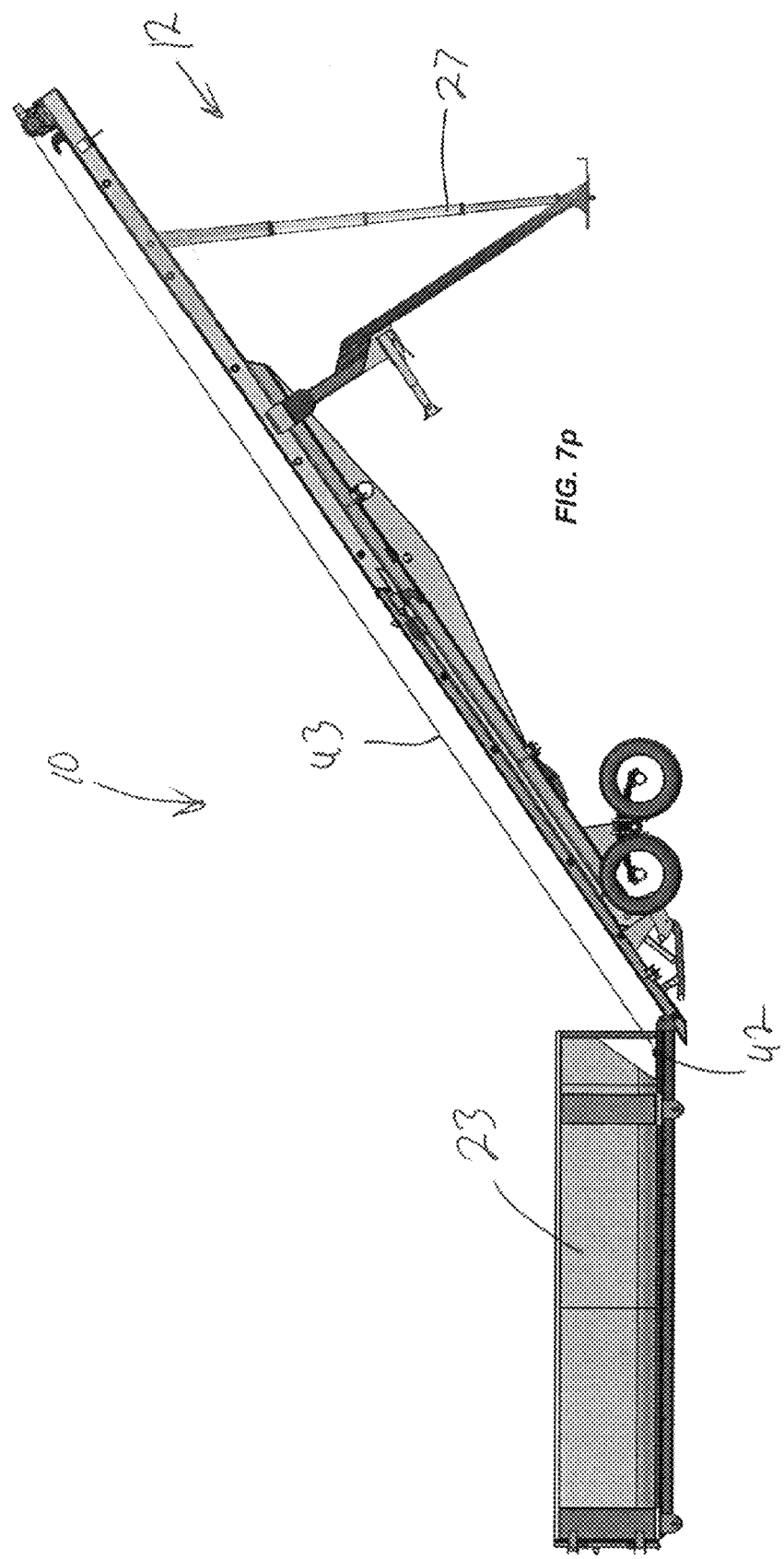

The containers are unloaded from the trailer 10 by the reverse sequence of steps previously described. The locks 60 are released. In FIG. 7j, the second hoist 14 is actuated to raise the tilt frame 20 and the container 23'. In FIG. 7k, the winch 47 is activated to extend the cable 49 and lower the container 23'. In FIG. 7l, the container 23' is lowered to the ground. The cable 49 may then be disconnected from the connector 44 and the cylinders 37 actuated to lower the tilt frame 20 and return the hoist 14 to its original position. The locks 64 are released. In FIG. 7m, the container 23 is now unhindered for unloading. In FIGS. 7n and 7o, the first hoist system 12 is actuated to raise the frame 13 and the container 23. The winch 36 is activated to extend the cable 43 and lower the container 23 to the ground. In FIG. 7p, the container 23 is unloaded. The cable 43 may be unconnected from the connector 42 and the hoist 12 returned to its original position.

In some embodiments, it may be necessary to only transport one container. To desirably locate the container in a middle position, rather than either of the positions of the containers 23, 23' as shown in FIG. 7i, the first hoist system 12 may be operated as described, with the winch 36 pulling the container to a middle position on the frame 13. To secure the container in such a middle position, a third set of locks 62 (see FIGS. 1, 2, 4 and 7i) is provided to engage the container. The middle-positioned container may also be unloaded as described.

In exemplary embodiments, the support frames 13, 20 operate as both the transport support frames and the moveable hoisting support frames. Thus, a frame or chassis for transport that is separate from inclining support frames is not needed. These embodiments of the system 10 may also be referred to as a "chassis-less" container trailer system.

In exemplary embodiments, a trailer system for transporting one or more containers includes a main trailer frame including a front portion and a rear portion defining a top support surface, the main trailer frame including a wheel frame pivotally coupled thereto, the rear portion including a tilt frame pivotally mounted thereto, a first pivot means operatively connected between the rear portion and the wheel frame for pivoting the main frame about a pivot point located on the wheel frame, a second pivot means operatively connected between the rear portion and the tilt frame for pivoting the tilt frame about a pivot point located on the rear portion, a first cable drive means located on the front portion and having an engagement member for engaging a first container and transporting the first container onto the top support surface of the main trailer frame to a transport position, a second cable drive means located on the tilt frame and having an engagement member for engaging the second container and transporting the second container onto the top support surface of the tilt frame to a transport position, a first stop connected to the main frame, and a second stop that is moveably coupled to the tilt frame such that it can be locked into position above or below the top surface of the tilt frame. The first pivot means may comprise a support pivotally connected to the main frame and a hitch, together permitting the main trailer frame and any associated container to pivot about a pivot point located on the wheel frame. The second pivot means may comprise at least one hydraulic cylinder of the type having an associated output shaft, a selected end of the cylinder and shaft being pivotally connected to the main trailer frame, the other end of the cylinder and shaft being pivotally connected to the tilt frame for pivoting the tilt frame and its associated container about the pivot point located on the rear portion.

In exemplary embodiments, a method of loading a dual container transport trailer with a pair of containers, the trailer having a main trailer frame including a front portion and a rear portion, both of which define a top support surface, the main trailer frame also including a pivotal wheel frame, the rear portion supporting a tilt frame pivotally mounted thereon for supporting a container, the method comprising providing a first pivot means operatively connected between the rear portion and the wheel frame for pivoting the main frame and any associated container about a pivot point located on the wheel frame, providing a second pivot means operatively connected between the rear portion and the tilt frame for pivoting the tilt frame and a second container about a pivot point located on the rear portion, providing a first cable drive means located on the front portion and having an engagement member for engaging a first container and transporting the first container onto the top support surface of the main trailer frame to a transport position, providing a second cable drive means located on the tilt frame and having an engagement member for engaging the second container and transporting the second container onto the top support surface of the tilt frame to a transport position, moving and locking a second stop into position below the top surface of the tilt frame, moving the main trailer frame from a horizontal transport position to an inclined loading position, moving the first container to the transport position by engaging the container with the engagement member of the first cable drive means and actuating the first cable drive means until the first container engages a first stop, moving the main trailer frame from the inclined loading position to a horizontal transport position, moving and locking the second stop into position above the top surface of the tilt frame, moving the tilt frame from a horizontal transport position to an inclined loading position, moving a second container to the transport position by engaging the container with the engagement member of the second cable drive means and actuating the second cable drive means until the first container engages the second stop, and moving the tilt frame from the inclined loading position to a horizontal transport position. The method may further comprise unloading the double container trailer by moving the tilt frame to the inclined position, moving the second container from the tilt frame to a surrounding support surface using the engagement member of the second cable and actuating the second cable drive means, disengaging the engagement member of the second cable from the second container, moving the tilt frame from the inclined position to a horizontal position, moving and locking the second stop into position below the top surface of the tilt frame, moving the main trailer frame to the inclined position, moving the first container from the main trailer frame to a surrounding support surface using the engagement member of the first cable and actuating the first drive means, disengaging the engagement member of the first cable from the first container, and moving the main trailer frame from the inclined position to a horizontal position.

While embodiments of the disclosure have been shown and described, modifications thereof can be made by one skilled in the art without departing from the spirit and teachings of the disclosure. The embodiments described and the examples provided herein are exemplary only, and are not intended to be limiting. Many variations and modifications of the disclosure disclosed herein are possible and are within the scope of the disclosure. Accordingly, the scope of protection is not limited by the description set out above, but is only limited by the claims which follow, that scope including all equivalents of the subject matter of the claims.

What is claimed is:
1. A system for transporting containers, comprising:
a main trailer frame;
a sub-frame coupled to the main frame;
a first hoist system to pivot the main frame; and
a second hoist system coupled between the main frame and the sub-frame to pivot the sub-frame;
wherein the main frame is configured to directly contact a first roll-off container.
2. The system of claim 1 wherein the first hoist system is configured to incline the main frame to load or unload the first roll-off container.
3. The system of claim 2 wherein the second hoist system is independently operable of the first hoist system to incline the sub-frame to load or unload a second roll-off container.
4. The system of claim 2 wherein the first hoist system comprises a first hydraulic cylinder coupled between a hitch and the main frame.
5. The system of claim 3 wherein the second hoist system includes a second hydraulic cylinder coupled between the main frame and the sub-frame.
6. The system of claim 4 wherein the first hoist system comprises a moveable support arm including a support leg coupled between the hitch and the main frame.
7. The system of claim 1 further comprising a first winch coupled to the main frame.
8. The system of claim 7 further comprising a second winch coupled to the sub-frame.
9. The system of claim 1 wherein the main frame is pivotally coupled to a wheel support assembly, and the sub-frame is pivotally coupled to the main frame.
10. The system of claim 1, wherein the system is chassisless.
11. A system for transporting containers, comprising:
a first frame;
a wheel support assembly pivotally coupled to the first frame; and
a second frame pivotally coupled to the first frame;
wherein the first frame and the second frame define a top support surface configured to support a first container and a second container; and wherein the first frame is configured to load the first container onto the top support surface, and the second frame is configured to load the second container onto the top support surface.

12. The system of claim 11 further comprising a first hoist system to pivot the first frame about the wheel support assembly.

13. The system of claim 12 further comprising a second hoist system to pivot the second frame relative to the first frame.

14. The system of claim 13 wherein the first and second hoist systems operate independently of each other to separately pivot the first and second frames.

15. The system of claim 11 wherein the first frame further comprises:
a first winch;
a first stop member to receive the first container in a fully stored position; and
a first moveable lock to secure the first container in the fully stored position.

16. The system of claim 15 wherein the first frame further includes a second moveable lock to secure a third container in an intermediate stored position.

17. The system of claim 15 wherein the second frame further comprises:
a second winch;
a second stop member to receive the second container in a fully stored position, wherein the second stop member is moveable to project above the top support surface and retract below the top support surface; and
a moveable lock coupled to the second frame to secure the second container in the fully stored position.

18. A method of transporting containers, comprising:
actuating a first hoist system to incline a main frame;
providing a sub-frame and a second hoist system coupled to and inclined with the main frame;
pulling a first container into contact with a top support surface of the main frame; and
reclining the main frame using the first hoist system.

19. The method of claim 18 wherein actuating the first hoist system to incline the main frame further comprises pivoting the main frame about a wheel support assembly engaged with the ground.

20. The method of claim 18 further comprising:
actuating the second hoist system, while the main frame is reclined, to pivot the sub-frame relative to the main frame and incline the sub-frame;
pulling a second container into contact with the top support surface; and
reclining the sub-frame using the second hoist system.

21. The method of claim 20 further comprising securing the first and second containers with locking members.

22. The method of claim 20 further comprising coupling the system to a truck for transport.

23. The method of claim 20 further comprising re-inclining the sub-frame to unload the second container with the second hoist system, and separately re-inclining the main frame to unload the first container with the first hoist system.

24. A system for transporting containers, comprising:
a first frame including a longitudinal axis, a forward frame portion, and a rear frame portion axially adjacent the forward frame portion;
a wheel support assembly pivotally coupled to the first frame; and
a second frame pivotally coupled to the rear frame portion of the first frame;
wherein the forward frame portion and the second frame define a top support surface configured to support a first container and a second container.

25. The system of claim 24, further comprising:
a first cable drive mechanism mounted to the first frame and configured to load the first container onto the top support surface; and
a second cable drive mechanism mounted to the second frame and configured to load the first container onto the top support surface.

26. The system of claim 25, wherein the first cable drive mechanism and the second cable drive mechanism each comprise a winch.

27. The system of claim 24, further comprising:
a first hoist system to pivot the first frame about the wheel support assembly; and
a second hoist system to pivot the second frame relative to the first frame.

28. The system of claim 27, wherein the second hoist system operates independently from the first hoist system to pivot the second frame relative to the main frame.

29. A system for transporting containers, comprising:
a wheel support assembly;
a first frame having a longitudinal axis, a first operable end, and a first terminal end axially separated from the first operable end, the first frame being pivotally coupled to the wheel support assembly proximate the first terminal end; and
a second frame having a second operable end and a second terminal end axially separated from the second operable end, the second frame being pivotally coupled to the first frame proximate the second terminal end;
wherein the second operable end of the second frame is axially separated from the first operable end of the first frame to dispose a container therebetween.

30. The system of claim 29, further comprising:
a first cable drive mechanism mounted to the first operable end of the first frame to load a first container onto the first frame; and
a second cable drive mechanism mounted to the second operable end of the second frame to load a second container onto the second frame.

31. The system of claim 30, wherein the first cable drive mechanism and the second cable drive mechanism each comprise a winch.

32. A trailer for transporting containers, comprising:
a first hoist system to support a first container;
a wheel support assembly pivotally coupled to the first hoist system;
the first hoist system including an actuator to pivot the first hoist system about the wheel support assembly for loading the first container;
a second hoist system mounted in the first hoist system; and
the second hoist system including an actuator to pivot the second hoist system relative to the first hoist system for loading a second container.

33. The trailer of claim 32, further comprising:
a first cable drive mechanism mounted on the first hoist system to pull the first container onto the first hoist system; and
a second cable drive mechanism mounted to the second hoist system to pull the second container onto the second hoist system.

34. A method of transporting containers, comprising:
inclining a first hoist system about a wheel support assembly;
pulling a first container onto the first hoist system;

inclining a second hoist system relative to the first hoist system, the second hoist system being mounted in the first hoist system;

pulling a second container onto the second hoist system.

35. The method of claim 34, further comprising:

declining the first hoist system about the wheel support assembly; and declining the second hoist system relative to the first hoist system to support the first and second containers along a top support surface of the first and second hoist systems.

* * * * *